US010209050B2

(12) United States Patent
Yang et al.

(10) Patent No.: US 10,209,050 B2
(45) Date of Patent: Feb. 19, 2019

(54) WHEEL CENTER BORE DETECTION DEVICE

(71) Applicant: CITIC Dicastal CO., LTD., Qinhuangdao (CN)

(72) Inventors: Jinling Yang, Qinhuangdao (CN); Li Yang, Qinhuangdao (CN); Weidong Liu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 120 days.

(21) Appl. No.: 15/620,299

(22) Filed: Jun. 12, 2017

(65) Prior Publication Data
US 2017/0363405 A1    Dec. 21, 2017

(30) Foreign Application Priority Data

Jun. 20, 2016 (CN) .......................... 2016 1 0442099

(51) Int. Cl.
| | | |
|---|---|---|
| G01B 3/50 | (2006.01) | |
| G01B 5/14 | (2006.01) | |
| G01M 17/013 | (2006.01) | |
| G01B 3/26 | (2006.01) | |
| G01B 5/12 | (2006.01) | |

(52) U.S. Cl.
CPC .................. *G01B 5/14* (2013.01); *G01B 3/26* (2013.01); *G01B 3/50* (2013.01); *G01B 5/12* (2013.01); *G01M 17/013* (2013.01); *B60B 2310/20* (2013.01)

(58) Field of Classification Search
CPC ....................................................... G01B 3/50
USPC ........................................ 33/203, 520, 555.1
See application file for complete search history.

(56) References Cited

U.S. PATENT DOCUMENTS

| | | | | |
|---|---|---|---|---|
| 4,151,655 A | * | 5/1979 | Makarainen | B60B 3/14 200/61.44 |
| 6,684,517 B2 | * | 2/2004 | Corghi | G01M 1/045 33/203.12 |
| 2004/0211075 A1 | * | 10/2004 | Hansen | G01M 1/045 33/520 |
| 2008/0244919 A1 | * | 10/2008 | Douglas | G01B 5/10 33/203.16 |
| 2011/0146089 A1 | * | 6/2011 | Gray | G01B 5/255 33/288 |

(Continued)

FOREIGN PATENT DOCUMENTS

| | | |
|---|---|---|
| CN | 101865765 A | 10/2010 |
| CN | 202200013 U | 4/2012 |

(Continued)

*Primary Examiner* — George B Bennett
(74) *Attorney, Agent, or Firm* — Syncoda LLC; Feng Ma

(57) ABSTRACT

A wheel center bore size qualification detection device includes an upper crossbeam, large guide posts, small guide posts, a center go/no go gauge no go end, a center go/no go gauge go end, small guide sleeves, large guide sleeves, a stand, jaws, small air cylinders, a coupling flange A, a coupling flange B, a lower crossbeam, bases, a large air cylinder, a centering pin A, centering pins B, a mobile sensor bracket, a mobile sensor, a detection connecting rod and bracket, a backing plate, connecting bolts and a fixed plate. The device provided has the characteristics of accurate location, practical structure, high detection accuracy, high efficiency, work safety and reliability and the like.

1 Claim, 1 Drawing Sheet

(56) References Cited

U.S. PATENT DOCUMENTS

| | | | | |
|---|---|---|---|---|
| 2014/0115906 A1* | 5/2014 | Pruitt | ..................... | G01B 5/255 |
| | | | | 33/203.18 |
| 2016/0195388 A1* | 7/2016 | D'Agostino | ....... | G01B 11/2755 |
| | | | | 33/228 |
| 2017/0211921 A1* | 7/2017 | Zheng | ..................... | G01B 5/06 |
| 2018/0001719 A1* | 1/2018 | Liu | ..................... | B60C 23/0494 |
| 2018/0243871 A1* | 8/2018 | Liu | ........................ | B23Q 3/107 |

FOREIGN PATENT DOCUMENTS

| | | |
|---|---|---|
| CN | 202719959 U | 2/2013 |
| CN | 103344202 A | 10/2013 |
| CN | 103920908 A | 7/2014 |
| CN | 203798286 U | 8/2014 |
| CN | 204329814 U | 5/2015 |
| JP | H07270105 A | 10/1995 |

\* cited by examiner

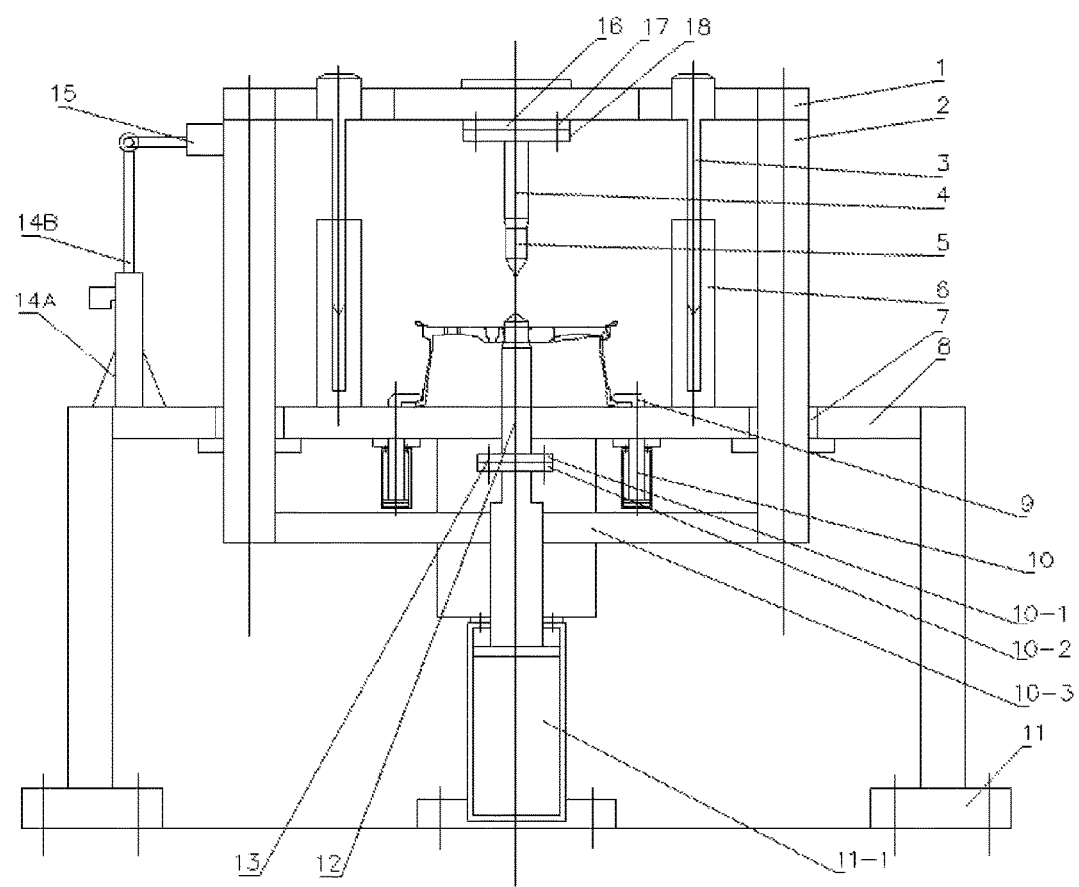

WHEEL CENTER BORE DETECTION DEVICE

CROSS-REFERENCE TO RELATED APPLICATIONS

This application is filed based upon and claims priority to Chinese Patent Application No. 201610442099.X, filed on Jun. 20, 2016, the entire contents of which are incorporated herein by reference.

BACKGROUND

As a wheel center bore directly matches with an automobile spindle in connection size, the size of the wheel center bore generally needs to be strictly controlled in a wheel machining production process. According to the traditional control method, an operator holds a go/no go gauge to perform 100% detection on the wheel center bore. However, by virtue of continuously improved automatic production mode, such detection mode obviously already cannot fit to modern production. Therefore, it needs an automatic detection device to achieve the full automation online detection requirement of the key size.

SUMMARY

The disclosure relates to a detection device, and in particular to a wheel center bore size qualification detection device.

A wheel center bore detection device is provided, which may capable of, among other things, automatically on-line detecting the size of a wheel center bore.

A wheel center bore detection device is composed of an upper crossbeam, large guide posts, small guide posts, a center go/no go gauge no go end, a center go/no go gauge go end, small guide sleeves, large guide sleeves, a stand, jaws, small air cylinders, a coupling flange, a coupling flange, a lower crossbeam, bases, a large air cylinder, a centering pin A, centering pins B, a mobile sensor bracket, a mobile sensor, a detection connecting rod, a backing plate, connecting bolts and a fixed plate.

The upper ends of the large guide posts are connected with the upper crossbeam, the lower ends of the large guide posts are connected with the lower crossbeam, the stand is fixed on the foundation through the bases, the large guide posts are placed in the large guide sleeves on the stand, and the large air cylinder is fixed on the foundation. The large air cylinder is connected with the lower crossbeam, and the large air cylinder drives a whole frame formed by the upper crossbeam, the lower crossbeam and the large guide posts to move up and down. The small guide posts are fixed between the center of the upper crossbeam and the inner sides of the two-side large guide posts, the small air cylinders are fixed on the lower surface of the stand, and the jaws are connected with the small air cylinders. The centering pin A is fixed on the coupling flange A, and the coupling flange B is fixedly connected with the coupling flange A.

The large air cylinder moves up and down to drive the coupling flange and the centering pin A to move up and down. The mobile sensor bracket is fixed on the stand. The mobile sensor is fixed on the mobile sensor bracket, the detection connecting rod is fixed on the left-side large guide post, a center go/no go gauge is fixed in the fixed plate, and the fixed plate is connected with the backing plate through the connecting bolts. The backing plate is fixed on the upper crossbeam.

During actual use, a piston rod of the air cylinder moves upwards to drive the whole frame formed by the upper crossbeam, the lower crossbeam and the large guide posts to move upwards; a robot clamps a wheel and places a wheel center bore among the centering pins B to be located, and then the piston rod of the air cylinder moves downwards under the action of compressed air; the small air cylinders drive the jaws to clamp the wheel; the piston rod of the air cylinder moves downwards to drive the whole frame formed by the upper crossbeam, the lower crossbeam and the large guide posts to move downwards and also drive the centering pins B for the wheel to drop down; and after the centering pins B for the wheel drop down, a conical head of the center go/no go gauge go end, the center go/no go gauge go end and the center go/no go gauge no go end sequentially enter the wheel center bore, wherein the whole process is controlled by a programmable logic controller (PLC), and a display only displays that the size of the wheel center bore is qualified or not. When the center go/no go gauge go end passes through the wheel center bore, namely reaches a depth set by a program of a computer, the mobile sensor transmits a signal to the computer to judge that the size of the wheel center bore at the go end is qualified; otherwise, the size of the wheel center bore at the go end is not qualified and is relatively smaller. When the center go/no go gauge no go end passes through the wheel center bore, namely reaches another depth set by the program of the computer, the mobile sensor transmits a signal to the computer to judge that the size of the wheel center bore at the no go end is not qualified; otherwise, the size of the wheel center bore at the no go end is qualified, and is relatively larger. The whole process is controlled by the PLC, and the program of the computer sets: only when the size of the wheel center bore is qualified at the go end and the no go end, the display displays that the size of the wheel center bore is qualified; and if the size of the wheel center bore is not qualified at one of the go end and the no go end, the display displays that the size of the wheel center bore is relatively smaller at the go end or is relatively larger at the no go end, that is, the size of the wheel center bore is not qualified.

In use, the device can meet the requirement for detecting whether the size of the wheel center bore is qualified. The wheel is firstly located by the centering pins and then is clamped, and the size of the wheel center bore is detected. The wheel center bore is accurately located by limiting the left and right guide posts and guide sleeves. The device has the characteristics of practical structure, high detection accuracy, high efficiency, working safety and reliability and the like.

BRIEF DESCRIPTION OF THE DRAWINGS

FIG. 1 is a schematic diagram of a wheel center bore size qualification detection device.

In the FIGURE, numeric symbols are as follows: 1-upper crossbeam, 2-large guide post, 3-small guide post, 4-center go/no go gauge no go end, 4-center go/no go gauge go end, 6-small guide sleeve, 7-large guide sleeve, 8-stand, 9-jaw, 10-small air cylinder, 10-1-coupling flange A, 10-2-coupling flange B, 10-3-lower crossbeam, 11-base, 11-1-large air cylinder, 12-centering pin A, 13-centering pin B, 14A-mobile sensor bracket, 14B-mobile sensor, 15-detection connecting rod, 16-backing plate, 17-connecting bolt, and 18-fixed plate.

DETAILED DESCRIPTION

In the following, the details and working conditions of a specific device provided by the disclosure are described in combination with figures.

A wheel center bore detection device is composed of an upper crossbeam 1, large guide posts 2, small guide posts 3, a center go/no go gauge no go end 4, a center go/no go gauge go end 5, small guide sleeves 6, large guide sleeves 7, a stand 8, jaws 9, small air cylinders 10, a coupling flange A 10-1, a coupling flange B 10-2, a lower crossbeam 10-3, bases 11, a large air cylinder 11-1, a centering pin A 12, centering pins B 13, a mobile sensor bracket 14A, a mobile sensor 14B, a detection connecting rod 15, a backing plate 16, connecting bolts 17 and a fixed plate 18.

The upper ends of the large guide posts 2 are connected with the upper crossbeam 1, the lower ends of the large guide posts 2 are connected with the lower crossbeam 10-3, the stand 8 is fixed on the foundation through the bases 11, the large guide posts 2 are placed in the large guide sleeves 7 on the stand 8, and the large air cylinder 11-1 is fixed on the foundation. The large air cylinder 11-1 is connected with the lower crossbeam 10-3, and the large air cylinder 11-2 drives a whole frame formed by the upper crossbeam 1, the lower crossbeam 10-3 and the large guide posts 2 to move up and down. The small guide posts 3 are fixed between the center of the upper crossbeam 1 and the inner sides of the two-side large guide posts 2, the small air cylinders 10 are fixed on the lower surface of the stand 8, and the jaws 9 are connected with the small air cylinders 10. The centering pins B 13 are fixed on the coupling flange A 10-1, and the coupling flange B 10-2 is fixedly connected with the coupling flange A 10-1.

The large air cylinder 11-1 moves up and down to drive the coupling flange A 10-1 and the centering pin A 12 to move up and down. The mobile sensor bracket 14A is fixed on the stand 8. The mobile sensor 14B is fixed on the mobile sensor bracket 14A, the detection connecting rod 15 is fixed on the left-side large guide post 2, a center go/no go gauge 4 is fixed in the fixed plate 18, and the fixed plate 18 is connected with the backing plate 16 through the connecting bolts 17. The backing plate 16 is fixed on the upper crossbeam 1.

During actual use, a piston rod of the air cylinder 11-1 moves upwards to drive the whole frame formed by the upper crossbeam 1, the lower crossbeam 10-3 and the large guide posts 2 to move upwards; a robot clamps a wheel and places a wheel center bore among the centering pins B 13 to be located, and then the piston rod of the air cylinder 11-1 moves downwards under the action of compressed air; the small air cylinders 10 drive the jaws 9 to clamp the wheel; the piston rod of the air cylinder 11-1 moves downwards to drive the whole frame formed by the upper crossbeam 1, the lower crossbeam 10-3 and the large guide posts 2 to move downwards and also drive the centering pins B 13 for the wheel to drop down; and after the centering pins B 13 for the wheel drop down, a conical head of the center go/no go gauge go end 5, the center go/no go gauge go end 5 and the center go/no go gauge no go end 4 sequentially enter the wheel center bore, wherein the whole process is controlled by a programmable logic controller (PLC), and a display only displays that the size of the wheel center bore is qualified or not. When the center go/no go gauge go end 5 passes through the wheel center bore, namely reaches a depth set by a program of a computer, the mobile sensor 14B transmits a signal to the computer to judge that the size of the wheel center bore at the go end is qualified; otherwise, the size of the wheel center bore at the go end is not qualified and is relatively smaller. When the center go/no go gauge no go end 4 passes through the wheel center bore, namely reaches another depth set by the program of the computer, the mobile sensor 14B transmits a signal to the computer to judge that the size of the wheel center bore at the no go end is not qualified; otherwise, the size of the wheel center bore at the no go end is qualified, and is relatively larger. The whole process is controlled by the PLC, and the program of the computer sets: only when the size of the wheel center bore is qualified at the go end and the no go end, the display displays that the size of the wheel center bore is qualified; and if the size of the wheel center bore is not qualified at one of the go end and the no go end, the display displays that the size of the wheel center bore is relatively smaller at the go end or is relatively larger at the no go end, that is, the size of the wheel center bore is not qualified.

The invention claimed is:
1. A wheel center bore detection device, comprising an upper crossbeam, large guide posts, small guide posts, a center go/no go gauge no go end, a center go/no go gauge go end, small guide sleeves, large guide sleeves, a stand, jaws, small air cylinders, a coupling flange A, a coupling flange B, a lower crossbeam, bases, a large air cylinder, a centering pin A, centering pins B, a mobile sensor bracket, a mobile sensor, a detection connecting rod, a backing plate, connecting bolts and a fixed plate, wherein the upper ends of the large guide posts are connected with the upper crossbeam, the lower ends of the large guide posts are connected with the lower crossbeam, the stand is fixed on the foundation through the bases, the large guide posts are placed in the large guide sleeves on the stand, and the large air cylinder is fixed on the foundation; the large air cylinder is connected with the lower crossbeam, and the large air cylinder drives a whole frame formed by the upper crossbeam, the lower crossbeam and the large guide posts to move up and down; the small guide posts are fixed between the center of the upper crossbeam and the inner sides of the two-side large guide posts, the small air cylinders are fixed on the lower surface of the stand, and the jaws are connected with the small air cylinders; the centering pins B are fixed on the coupling flange A, and the coupling flange B is fixedly connected with the coupling flange A; and the large air cylinder moves up and down to drive the coupling flange A and the centering pin A to move up and down; the mobile sensor bracket is fixed on the stand; the mobile sensor is fixed on the mobile sensor bracket, the detection connecting rod is fixed on the left-side large guide post, a center go/no go gauge is fixed in the fixed plate, and the fixed plate is connected with the backing plate through the connecting bolts; and the backing plate is fixed on the upper crossbeam.

* * * * *